United States Patent
Sakai et al.

(10) Patent No.: US 8,859,140 B2
(45) Date of Patent: Oct. 14, 2014

(54) ELECTRODE FOR MOLTEN SALT BATTERY, MOLTEN SALT BATTERY, AND METHOD FOR PRODUCING ELECTRODE

(75) Inventors: Syoichiro Sakai, Osaka (JP); Shinji Inazawa, Osaka (JP); Masatoshi Majima, Osaka (JP); Koji Nitta, Osaka (JP); Atsushi Fukunaga, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 301 days.

(21) Appl. No.: 13/328,329

(22) Filed: Dec. 16, 2011

(65) Prior Publication Data

US 2012/0088139 A1    Apr. 12, 2012

Related U.S. Application Data

(63) Continuation of application No. PCT/JP2011/057903, filed on Mar. 29, 2011.

(30) Foreign Application Priority Data

Apr. 27, 2010    (JP) .................................. 2010-102271

(51) Int. Cl.
- *H01M 10/056* (2010.01)
- *H01M 10/26* (2006.01)
- *H01M 10/39* (2006.01)
- *H01M 4/66* (2006.01)
- *H01M 4/80* (2006.01)

(52) U.S. Cl.
CPC ............. *H01M 10/399* (2013.01); *Y02E 60/12* (2013.01); *H01M 4/661* (2013.01); *H01M 4/808* (2013.01)

USPC ........... 429/199; 429/188; 429/206; 429/207; 429/209; 429/103

(58) Field of Classification Search
USPC ........................................ 429/102
See application file for complete search history.

(56) References Cited

U.S. PATENT DOCUMENTS

| 3,933,520 A | 1/1976 | Gay et al. |
| 5,162,172 A * | 11/1992 | Kaun ........................... 429/155 |
| 5,972,538 A | 10/1999 | Saito et al. |

(Continued)

FOREIGN PATENT DOCUMENTS

| JP | 51-138823 A | 11/1976 |
| JP | 61-163571 A | 7/1986 |

(Continued)

OTHER PUBLICATIONS

Kubota et al., "Novel inorganic ionic liquids possessing low melting temperatures and wide electrochemical windows: Binary mixtures of alkali bis(fluorosulfonyl)amides," Oct. 2008, Electrochemical Communications, 10, 1886-1888.*

(Continued)

*Primary Examiner* — Ula C Ruddock
*Assistant Examiner* — Matthew Van Oudenaren
(74) *Attorney, Agent, or Firm* — Ditthavong & Steiner, P.C.

(57) ABSTRACT

An electrode for a molten salt battery includes a current collector connectable to an electrode terminal of the molten salt battery and an active material. The current collector has an internal space in which small spaces are mutually coupled. The internal space of the current collector is filled with the active material.

9 Claims, 5 Drawing Sheets

(56) References Cited

U.S. PATENT DOCUMENTS

| | | | |
|---|---|---|---|
| 6,872,492 | B2 | 3/2005 | Barker et al. |
| 2001/0021790 | A1* | 9/2001 | Yonezawa et al. ............... 564/80 |
| 2005/0238961 | A1 | 10/2005 | Barker et al. |
| 2007/0072034 | A1 | 3/2007 | Barker et al. |
| 2007/0160519 | A1 | 7/2007 | Barker et al. |
| 2010/0159334 | A1* | 6/2010 | Kashima et al. ......... 429/231.95 |
| 2012/0328960 | A1* | 12/2012 | Ito et al. ........................ 429/336 |

FOREIGN PATENT DOCUMENTS

| | | | | |
|---|---|---|---|---|
| JP | 6-196170 | A | 7/1994 | |
| JP | 9-306506 | A | 11/1997 | |
| JP | 10-050298 | A | 2/1998 | |
| JP | 10-326628 | A | 12/1998 | |
| JP | 10326628 | * | 12/1998 | ............ H01M 10/40 |
| JP | 2001-357873 | A | 12/2001 | |
| JP | 2004-533706 | A | 11/2004 | |
| JP | 2009-067644 | A | 4/2009 | |
| JP | 2009-187858 | A | 8/2009 | |
| WO | WO 2011/135967 | A1 | 3/2011 | |

OTHER PUBLICATIONS

International Search Report PCT/JP2011/057903, mailing date: Jun. 28, 2011.

Physicochemical Properties of Binary Molten NaTFSI-CsTFSI and an Application to Sodium Secondary Batteries, Summary of Battery Symposium, Nov. 5, 2008, vol. 49, p. 250.

Physicochemical Properties of Molten NaTFSI-CsTFSI System and Applications to Sodium Secondary Batteries (II), Summary of Meeting on Materials for Chemical Batteries, Jun. 11, 2007, vol. 9, pp. 59-60.

The Na/NaCrO2 Battery Using Binary Molten NaTFSA-CsTFSA, Summary of Battery Symposium, Mar. 29, 2009, vol. 76, p. 377.

International Preliminary Report on Patentability for PCT/JP2011/057903 dated Dec. 10, 2012, pp. 1-10.

* cited by examiner

| Unit | Structure | Filling Amount (g/cm²) | Thickness of Positive Electrode (mm) | Amount of Positive Electrode Active Material (g/cm²) | Theoretical Capacity (mAh/cm²) | Actual Measured Capacity (mAh/cm²) | Utilization Ratio (%) |
|---|---|---|---|---|---|---|---|
| Example 1 | — | 0.1 | 0.5 | 85×10⁻³ | 6.37 | 6.1 | 96 |
| Example 2 | — | 4 | 20 | 3.4 | 255 | 156 | 61 |
| Example 3 | Through Holes | 4 | 20 | 3.4 | 254.5 | 211 | 87 |
| Example 4 | Six Layers | 6 | 5mm×6 | 5.1 | 382 | 312 | 82 |
| Example 5 | Holes | 4 | 20 | 3.4 | 255 | 199 | 78 |
| Example 6 | Holes/ Six Layers | 6 | 5mm×6 | 4.95 | 371 | 350 | 94 |
| Comparative Example 1 | — | 0.01 | 0.05 | 8.5×10⁻³ | 0.637 | 0.62 | 97 |
| Comparative Example 2 | — | 0.1 | 0.5 | 85×10⁻³ | 6.37 | 0.52 | 8.1 |

ELECTRODE FOR MOLTEN SALT BATTERY, MOLTEN SALT BATTERY, AND METHOD FOR PRODUCING ELECTRODE

FIELD OF THE INVENTION

The present invention relates to an electrode for a molten salt battery, a molten salt battery, and a method for producing an electrode.

BACKGROUND OF THE INVENTION

For example, the molten salt described in Patent Document 1 has a lower melting point than a conventional molten salt. Therefore, the molten salt disclosed in this document has been investigated for use in a molten salt battery containing sodium. For practical utilization of a molten salt battery, increasing the charge capacity is an issue. Increasing the thickness of a positive electrode layer may be a solution to increasing the charge capacity. However, a problem is that when the thickness of the positive electrode layer exceeds a predetermined value, the charge capacity does not increase even if the thickness of the positive electrode layer is increased beyond the predetermined value.

PRIOR ART DOCUMENT

Patent Document

Patent Document 1: Japanese Laid-Open Patent Publication No. 2009-67644

SUMMARY OF THE INVENTION

An objective of the present invention is to provide an electrode for a molten salt battery, a molten salt battery, and a method for producing an electrode, which can increase the charge capacity.

To achieve the foregoing objective and in accordance with a first aspect of the present invention, an electrode for a molten salt battery is provided that includes a current collector connectable to an electrode terminal of the molten salt battery and an active material. The current collector has an internal space in which small spaces are coupled. The internal space is filled with the active material.

In the case of an electrode in which an active material is applied to a planar current collector, if the thickness of an active material layer is increased, the distance from the active material in the active material layer to the current collector will be increased. In this case, there is a correlation between the distance from the active material to the current collector and the electrical resistance. Therefore, if the thickness of the active material layer is increased, the utilization ratio of the active material will decrease correspondingly. As a result, even if the thickness of the active material layer is increased to increase the amount of the active material, the charge capacity will not be increased depending on the increase. On the other hand, since the internal space of the current collector is filled with the active material according to the present invention, the distance between the active material and the current collector will not be increased even if the thickness of the electrode is increased. Therefore, reduction in the utilization ratio of the active material is suppressed. Consequently, the charge capacity can be increased depending on the increase in the thickness of the electrode without being influenced by the thickness of the electrode.

In the above described electrode for a molten salt battery, it is preferable that a void into which molten salt is flowable be provided in the electrode.

According to this invention, molten salt flows into the voids in the electrode. Further, ions from the molten salt also permeate the active material layer from the surface in the voids. That is, since the surface area of the electrode is increased by providing the voids in the electrode, the movement of the molten salt into the active material layer and the movement of the active material to the molten salt are promoted.

In the above described electrode for a molten salt battery, it is preferable that a direction from a positive electrode to a negative electrode in a state where the electrode is attached to the molten salt battery be defined as an electric field direction, and that the void be a through hole extending along the electric field direction.

In the molten salt battery, the ions of the molten salt move from the positive electrode to the negative electrode. According to this invention, since the through holes extend along the direction in which the ions in the molten salt move, the molten salt can be smoothly transported.

In the above described electrode for a molten salt battery, it is preferable that the void be a space formed by sublimation of a sublimable substance.

According to this invention, mechanical force is not applied to the electrode when the voids are formed in the electrode. Therefore, reduction in the mechanical strength of the electrode can be suppressed compared with the case where the voids are mechanically formed in the electrode.

In the above described electrode for a molten salt battery, it is preferable that an interval between adjacent voids be set to a reference distance or less, and that the reference distance be determined based on a critical immersion distance.

The oxidation-reduction reaction occurs not only on the surface of the active material layer, that is, the inner surface of the voids, but also in the inner part of the active material layer. On the other hand, the oxidation-reduction reaction is unlikely to occur in the part where the ions of the molten salt do not permeate the active material layer. According to this invention, it is possible to reduce the part where the oxidation-reduction reaction does not occur by specifying the distance between the voids. Therefore, the utilization ratio of the active material is improved.

In the above described electrode for a molten salt battery, it is preferable that the reference distance be set to twice the critical immersion distance to which an ion of a molten salt permeates the electrode.

According to this invention, the utilization ratio of the active material is improved because of the decrease in the part where the ions of the molten salt do not permeate in the active material layer.

In the above described electrode for a molten salt battery, it is preferable that the current collector comprise an aggregate of metal pieces.

According to this invention, the gap between the metal pieces is the small space to hold the active material, and the small spaces are coupled in the shape of a network to form the internal space.

In the above described electrode for a molten salt battery, it is preferable that the metal pieces comprise aluminum fiber.

According to this invention, since aluminum is lighter than copper and iron, the aluminum fibers can reduce the weight of the current collector as compared with the current collectors made of copper fibers and iron fibers.

In the above described electrode for a molten salt battery, it is preferable that the current collector comprise a metal porous body.

The metal porous body has a large number of voids and has conductivity. Therefore, the metal porous body can be used as the current collector.

In the above described electrode for a molten salt battery, it is preferable that the active material be at least one selected from the group consisting of $NaCrO_2$, $TiS_2$, $NaMnF_3$, $Na_2FePO_4F$, $NaVPO_4F$, $Na_{0.044}MnO_2$, and $FeF_3$.

In the above described electrode for a molten salt battery, it is preferable that the thickness of the electrode be set to 0.1 mm or more and 50 mm or less.

When the thickness of the electrode is less than 0.1 mm, there is no difference between the charge capacity of a conventional positive electrode in which the active material is laminated to an aluminum sheet and that of the positive electrode of the present invention. Further, if the thickness of the electrode exceeds 50 mm, the electric resistance of the positive electrode will be increased. Consequently, the electrical loss can be suppressed from being excessively increased and the charge can be ensured, by setting the thickness of the electrode in the range of 0.1 mm or more and 50 mm or less.

In order to solve the problems as described above, a second aspect of the present invention provides a molten salt battery comprising a negative electrode, a molten salt, a positive electrode composed of the electrode as described above, and a separator to isolate the negative electrode from the positive electrode.

In the above described electrode for a molten salt battery, it is preferable that the molten salt contain an anion represented by the following formula (1) and a cation of at least one of an alkali metal and an alkaline earth metal:

[Formula 1]

(1)

(wherein $R^1$ and $R^2$ each independently denote fluorine or a fluoroalkyl group.)

The eutectic point of the above molten salt is lower than the operating temperature of a NaS battery. Therefore, by forming a molten salt battery using this molten salt, the operating temperature of the battery can be made lower than that of the NaS battery.

In the above described electrode for a molten salt battery, it is preferable that the molten salt battery comprise a plurality of sets of negative electrodes and positive electrodes which are formed by alternately laminating the negative electrode and the positive electrode, and that the separator be provided between the negative electrode and the positive electrode in each set of the negative electrode and the positive electrode.

According to this structure, the charge capacity can be increased while maintaining the volume of the molten salt battery.

In order to solve the problems as described above, a third aspect of the present invention provides a method for producing an electrode of a molten salt battery. The production method includes a filling step for filling a current collector with an active material, a compression step for compressing a product formed in the filling step, and a hole-forming step for forming a through hole in a product formed in the compression step.

To achieve the foregoing objective and in accordance with a fourth aspect of the present invention, a method for producing an electrode for a molten salt battery is provided. The method includes: a filling step for filling a current collector with an active material and a sublimate substance; a compression step for compressing a product formed in the filling step; and a heating step for heating a pellet formed in the compression step to sublimate the sublimable substance.

Since the sublimable substance is a solid at ordinary temperature, it occupies a region in the active material layer. Further, even if the active material layer containing the sublimable substance is compressed, the region occupied by the sublimable substance as a solid is compressed only insignificantly. Therefore, voids can be formed in a compressed product by heating the compressed product to sublimate the sublimable substance.

DETAILED DESCRIPTION OF THE PREFERRED EMBODIMENTS

One embodiment of the present invention will be described with reference to FIGS. 1 to 7.

Figure 1:
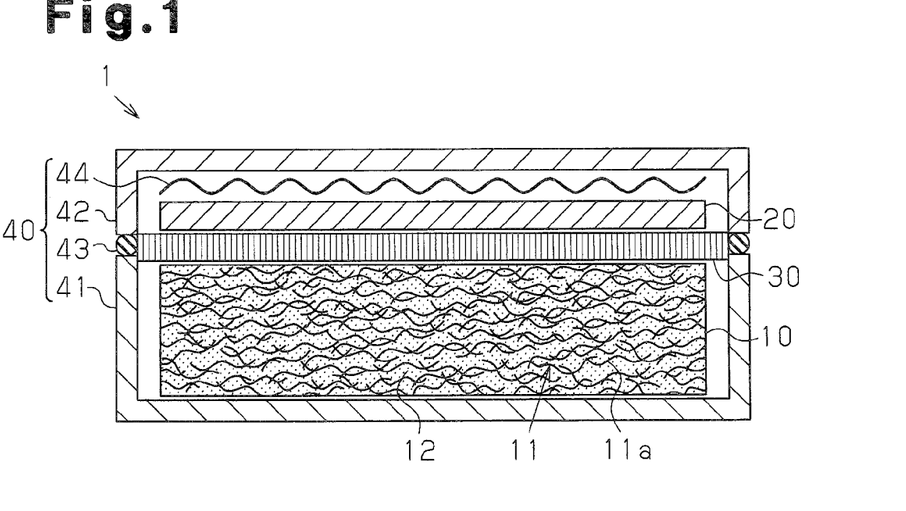
FIG. 1 is a schematic diagram showing a molten salt battery according to one embodiment of the present invention.

As shown in FIG. 1, a molten salt battery 1 comprises a positive electrode 10, a negative electrode 20, a separator 30 arranged between the positive electrode 10 and the negative electrode 20, and an accommodation case 40. The accommodation case 40 accommodates the positive electrode 10, the negative electrode 20, and the separator 30. The accommodation case 40 is filled with a molten salt. Hereinafter, in describing the molten salt battery 1, the dimension in the direction from the positive electrode 10 to the negative electrode 20 is referred to as "thickness".

The accommodation case 40 comprises a positive electrode case 41, a negative electrode case 42, a sealing member 43 which seals the space between the positive electrode case 41 and the negative electrode case 42, and a plate spring 44. The positive electrode case 41 is electrically connected with the positive electrode 10. The negative electrode case 42 is electrically connected with the negative electrode 20. The plate spring 44 urges the negative electrode 20 toward the positive electrode 10. The positive electrode case 41 and the negative electrode case 42 function as an electrode terminal connected to an external apparatus. The sealing member 43 is made of a fluorine-based elastic member. The fluorine-based elastic member has corrosion resistance to a positive electrode active material, negative electrode active material, and molten salt. The positive electrode case 41 and the negative electrode case 42 are made of a conductive member such as an aluminum alloy. The aluminum alloy has corrosion resistance to positive electrode active material, negative electrode active material, and molten salt.

The positive electrode 10 comprises a current collector 11 and an active material 12, in which a positive electrode active material is contained. The current collector 11 collects the charge generated by the oxidation-reduction reaction of the positive electrode active material. An aluminum nonwoven fabric is used as the current collector 11. The aluminum nonwoven fabric is an aggregate of aluminum fibers 11a, and has a space for holding the active material 12.

Figure 2:
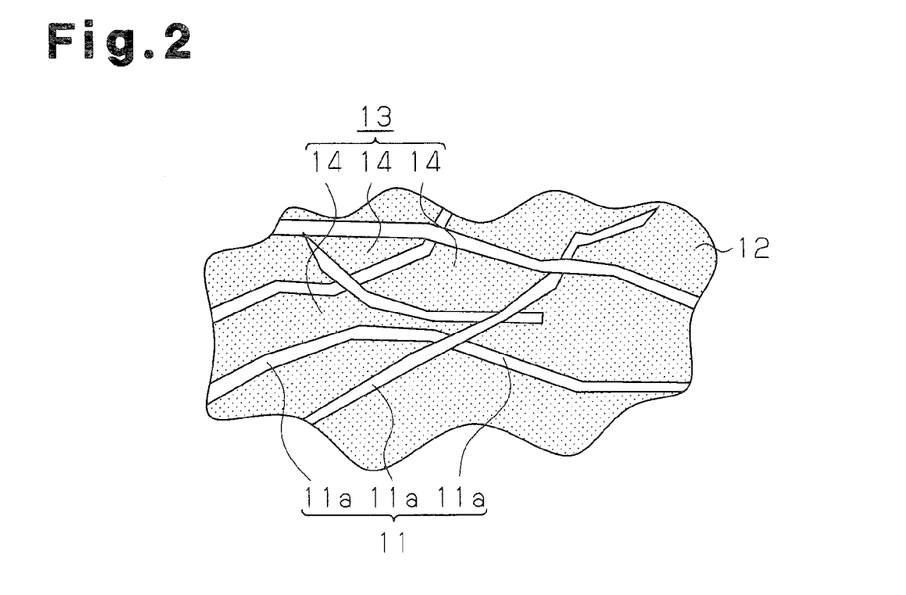
FIG. 2 is a schematic diagram showing the internal structure of a current collector.

As shown in FIG. 2, the aluminum fibers 11a extend in the mutually different directions, and are present in the state where the fibers are mutually entangled. This forms a large number of small spaces 14 between a plurality of fibers. The small spaces 14 are mutually coupled in the shape of a network. As a result, an internal space 13 to be filled with the active material 12 is formed in the current collector 11. Each aluminum fiber 11a is not connected with other aluminum fibers 11a. Therefore, each aluminum fiber 11a is independently movable and generally equally dispersed across the whole current collector 11. Each aluminum fiber 11a is in contact with other aluminum fibers 11a. Therefore, all the aluminum fibers 11a which form the current collector 11 are mutually electrically connected.

The positive electrode 10 is formed as follows. First, $NaCrO_2$ as a positive electrode active material, acetylene black, polyvinylidene fluoride, and N-methyl-2-pyrrolidone are mixed in a mass ratio of 85:10:5:50, respectively, to form the active material 12. The acetylene black is used as a conducting material; the polyvinylidene fluoride is used as an adhesive; and the N-methyl-2-pyrrolidone is used as a solvent.

Next, an aluminum nonwoven fabric having a diameter of 100 μm and a porosity of 80% is filled with the active material 12. After drying, the aluminum nonwoven fabric filled with the active material 12 is pressed at a pressure of 1000 kgf/cm². The thickness of the positive electrode 10 is adjusted by changing the amount of the active material 12. The porosity of the aluminum nonwoven fabric is defined by the proportion of the nonwoven fabric to the volume of the aluminum nonwoven fabric.

A molten salt (hereinafter, NaFSA-KFSA) containing an anion (hereinafter, "FSA") represented by the following formula (1), a sodium cation, and a potassium cation is used.

[Formula 1]

(1)

R1 and R2 each denote F (fluorine). The composition of NaFSA-KFSA is 45 mol % and 55 mol %, respectively. The eutectic temperature of NaFSA-KFSA is the lowest in the case of the above composition, and specifically it is 57° C.

An Sn—Na alloy is used as the negative electrode 20. The core part of the negative electrode 20 is made of Sn, and the surface of the negative electrode 20 is made of a Sn—Na alloy. The Sn—Na alloy is formed by plating in which Na is deposited on Sn metal. The separator 30 isolates the positive electrode 10 from the negative electrode 20 so that the positive electrode 10 may not be brought into contact with the negative electrode 20. The molten salt can pass through the separator 30. The molten salt is brought into contact with the positive electrode 10 and the negative electrode 20. Specifically, a glass cloth having a thickness of 200 μm is used as the separator 30.

Hereinafter, Examples and Comparative Examples of the molten salt battery 1 having the above positive electrode 10 will be described.

The charge capacity of the molten salt battery 1 of Examples is determined by setting the operating temperature to 90° C., passing constant current between the positive electrode 10 and the negative electrode 20, and measuring the time until the voltage between the two electrodes increases to 3.5V. Current density is set depending on the theoretical capacity determined based on the amount of the positive electrode active material. The theoretical capacity is determined based on the maximum amount of intercalation of Na ions and the amount of the positive electrode active material of the positive electrode 10. The utilization ratio shows the ratio of the positive electrode active material contributing to actual charge. The utilization ratio is determined by the following expression (2).

$$\text{Utilization ratio} = (\text{actual measured capacity} \times 100)/(\text{theoretical capacity}) \quad (2)$$

Hereinafter, modifications of the positive electrode 10 will be described. A Sn—Na alloy is used as the negative electrode 20 for each Example. The charge capacity of the molten salt battery 1 is determined by the product of the charging period from a charge starting voltage of 2.5V to a discharge starting voltage of 3.5V and the current density passed during the charging period.

Example 1

(Conditions)
The materials and the method for forming the positive electrode 10 are the same as those described in the embodiment.
The filling amount of the active material 12 in the current collector 11 is 0.1 g/cm².
The thickness of the positive electrode 10 after pressing is 500 μm.
The amount of the positive electrode active material is 85 mg.
The theoretical capacity of the molten salt battery 1 is 6.37 mAh/cm².
The current density at the time of measurement of the molten salt battery 1 is 0.65 mA/cm².
(Results)
The actual measured capacity of the molten salt battery 1 was 6.1 mAh/cm².
The utilization ratio was 96%.

Example 2

(Conditions)
The materials and the method for forming the positive electrode 10 are the same as those described in the embodiment.
The filling amount of the active material 12 in the current collector 11 is 4 g/cm².
The thickness of the positive electrode 10 after pressing is 20 mm.

The amount of the positive electrode active material is 3.4 g/cm$^2$.

The theoretical capacity of the molten salt battery 1 is 255 mAh/cm$^2$.

The current density at the time of actual measurement of the molten salt battery 1 is 26 mA/cm$^2$.

(Results)

The actual measured capacity of the molten salt battery 1 was 156 mAh/cm$^2$.

The utilization ratio was 61%.

Example 3

Figure 3:
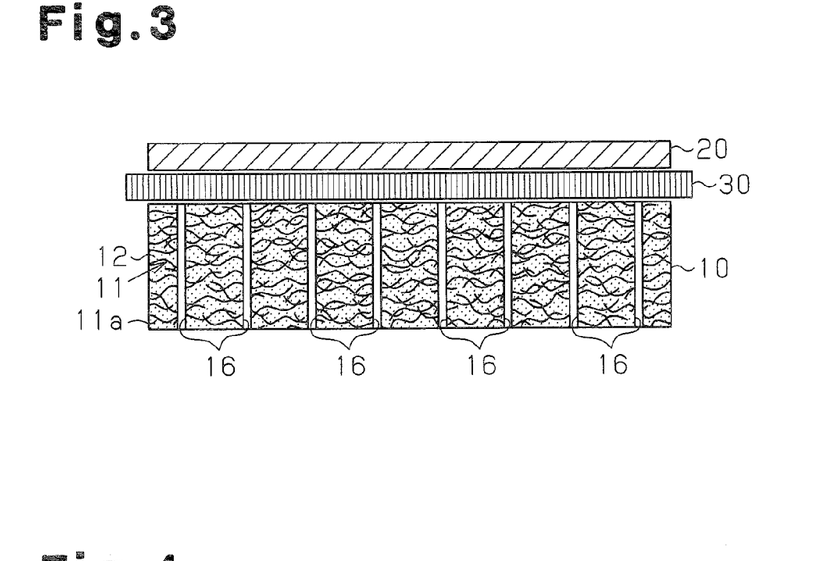
FIG. 3 is a schematic diagram showing the internal structure of the molten salt battery of Example 3.

FIG. 3 shows the structure of the molten salt battery 1 of Example 3.

(Conditions)

The materials and the method for forming the positive electrode 10 are the same as those described in the embodiment.

The filling amount of the active material 12 in the current collector 11 is 4 g/cm$^2$.

The thickness of the positive electrode 10 after pressing is 20 mm.

In the current collector 11, a plurality of through holes 16 extending in the thickness direction of the current collector 11 are formed. The diameter of the through hole 16 is 0.5 mm. A through hole 16 is formed with an interval of 10 mm from an adjacent through hole 16. The through hole 16 is formed with a drill.

The current density at the time of actual measurement of the molten salt battery 1 is 26 mA/cm$^2$.

The amount of the positive electrode active material is 3.4 g/cm$^2$.

The theoretical capacity of the molten salt battery 1 is 254.5 mAh/cm$^2$.

(Results)

The actual measured capacity of the molten salt battery 1 was 221 mAh/cm$^2$.

The utilization ratio was 87%.

Example 4

Figure 4:
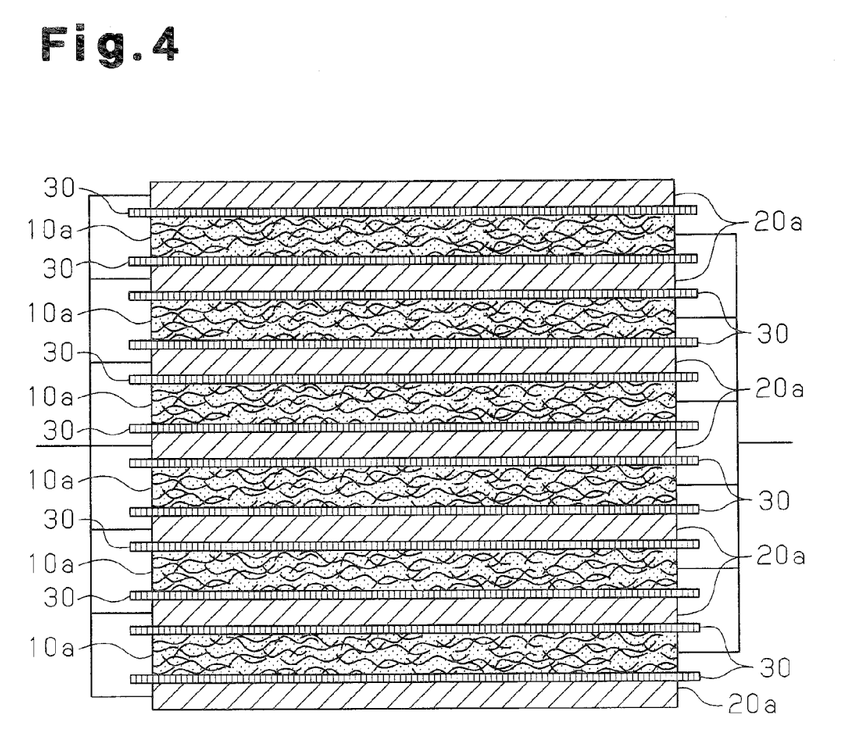
FIG. 4 is a schematic diagram showing the internal structure of the molten salt battery of Example 4.

The structure of the molten salt battery 1 of Example 4 will be described with reference to FIG. 4.

The positive electrode 10 is formed from six partial positive electrodes 10a. The negative electrode 20 is formed from seven partial negative electrodes 20a. A partial negative electrode 20a is provided between adjacent positive electrodes 10. Partial negative electrodes 20a are provided on the outside of the partial positive electrodes 10a each located at the both ends of the molten salt battery 1. A separator 30 is provided between the partial positive electrode 10a and the partial negative electrode 20a. Each partial positive electrode 10a is connected in parallel. Each partial negative electrode 20a is also connected in parallel.

(Conditions)

The materials and the method for forming the partial positive electrode 10a are the same as those described in the embodiment.

The filling amount of the active material 12 in the current collector 11 which forms each partial positive electrode 10a is 6 g/cm$^2$.

The thickness of each partial positive electrode 10a after pressing is 5 mm.

The amount of the positive electrode active material is 5.1 g/cm$^2$.

The theoretical capacity of the molten salt battery 1 is 382 mAh/cm$^2$.

The current density at the time of actual measurement of the molten salt battery 1 is 38 mA/cm$^2$.

(Results)

The actual measured capacity of the molten salt battery 1 was 312 mAh/cm$^2$.

The utilization ratio was 82%.

Example 5

In Example 5, the positive electrode 10 was prepared by the following method.

First, NaCrO$_2$, acetylene black, polyvinylidene fluoride, N-methyl-2-pyrrolidone, and naphthalene were mixed in a weight ratio of 85:10:5:50:10, respectively, to form the active material 12. Next, the current collector 11 was formed using an aluminum nonwoven fabric having a wire diameter of 100 μm and a porosity of 80%, and the resulting current collector was filled with the active material 12. Subsequently, after drying, the aluminum nonwoven fabric filled with the active material 12 was pressed at a pressure of 1000 kgf/cm$^2$. Next, the pressed molded product was vacuum dried at 60° C. for 12 hours to sublimate naphthalene.

Naphthalene is solid at ordinary temperature. Therefore, even if the aluminum nonwoven fabric filled with the active material 12 is pressed, a solid of naphthalene is continuously present in the inner part of the positive electrode 10. Naphthalene was sublimated after the pressing to form a hole 15 (void) in the part in which the solid of naphthalene was present.

Figure 5A:
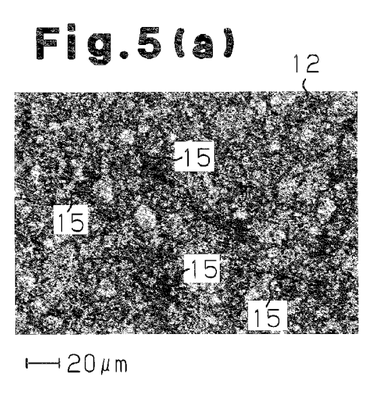
FIG. 5 is a photograph showing the section of the positive electrode of the molten salt battery of Example 5.
Figure 5B:
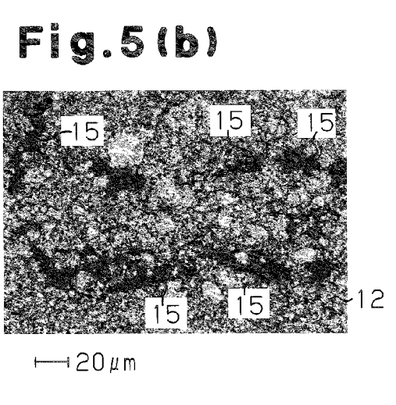
Figure 5C:
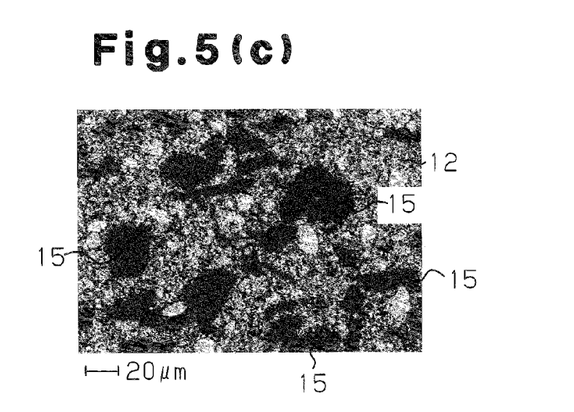

FIG. 5 shows the section of a part between aluminum fibers, in which a black part shows the hole 15 and a white part shows the active material 12. FIG. 5(a) shows a sectional photograph of the positive electrode 10 in which the ratio of naphthalene to the filling amount of the active material 12 is 10% by mass. FIG. 5(b) shows a sectional photograph of the positive electrode 10 in which the ratio of naphthalene to the filling amount of the active material 12 is 20% by mass. FIG. 5(c) shows a sectional photograph of the positive electrode 10 in which the ratio of naphthalene to the filling amount of the active material 12 is 50% by mass. As shown in these sectional photographs, there is a correlation between the ratio of naphthalene to the filling amount of the active material 12 and the total volume of the holes 15. Therefore, the total volume of the holes 15 can be controlled by changing the ratio of naphthalene to the filling amount of the active material 12.

(Conditions)

The filling amount of the active material 12 in the current collector 11 is 4 g/cm$^2$.

The thickness of the positive electrode 10 after sublimation is 20 mm.

The amount of the positive electrode active material is 3.4 g/cm$^2$.

The theoretical capacity of the molten salt battery 1 is 255 mAh/cm$^2$.

The current density at the time of actual measurement of the molten salt battery 1 is 26 mA/cm$^2$.

(Results)

The actual measured capacity of the molten salt battery 1 was 199 mAh/cm$^2$.

The utilization ratio was 78%.

Example 6

In Example 6, the positive electrode 10 was prepared by the following method.

In the same manner as in Example 4, the positive electrode 10 was prepared by alternately laminating six partial positive electrodes 10a and seven partial negative electrodes 20a. First, $NaCrO_2$, acetylene black, polyvinylidene fluoride, N-methyl-2-pyrrolidone, and naphthalene were mixed in a weight ratio of 85:10:5:50:10, respectively, to form the active material 12. Next, the current collector 11 was formed using an aluminum nonwoven fabric having a wire diameter of 100 μm and a porosity of 80%, and the resulting current collector was filled with the active material 12. Subsequently, after drying, the aluminum nonwoven fabric filled with the active material 12 was pressed at a pressure of 1000 $kgf/cm^2$. Next, the through holes 16 each having a diameter of 0.5 mm were formed at intervals of 5 mm in the pressed molded product using a drill. Then, the molded product was vacuum dried at 60° C. for 12 hours to sublimate naphthalene.

(Conditions)
The filling amount of the active material 12 in the current collector 11 which forms each partial positive electrode 10a is 1 $g/cm^2$.
The thickness of each partial positive electrode 10a after pressing is 5 mm.
The amount of the positive electrode active material is 4.95 $g/cm^2$.
The theoretical capacity of the molten salt battery 1 is 371 $mAh/cm^2$.
The current density at the time of actual measurement of the molten salt battery 1 is 38 $mA/cm^2$.

(Results)
The actual measured capacity of the molten salt battery 1 was 350 $mAh/cm^2$.
The utilization ratio was 94%.

Comparative Example 1

Figure 6:
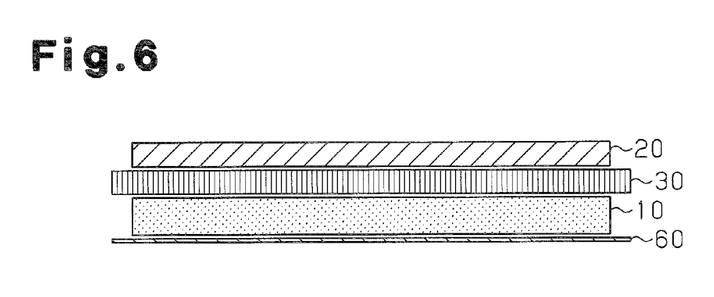
FIG. 6 is a schematic diagram showing the internal structure of the molten salt battery of Comparative Example 1.

(Structure)
FIG. 6 shows the positive electrode 10 of Comparative Example 1. As a comparative example, a positive electrode 10 having a conventional structure is mentioned.

An active material 12 in which $NaCrO_2$, acetylene black, polyvinylidene fluoride, and N-methyl-2-pyrrolidone were kneaded in a weight ratio of 85:10:5:50 was used as the material of the positive electrode 10. Then, the active material 12 was applied to an aluminum sheet 60 having a thickness of 20 μm to form a positive electrode 10.

(Conditions)
The filling amount of the active material 12 in the current collector 11 is 0.01 $g/cm^2$.
The amount of the positive electrode active material is 8.5 $mg/cm^2$.
The thickness of the positive electrode 10 after being applied to the aluminum sheet 60 is 50 μm.
The theoretical capacity of the molten salt battery 1 is 0.637 $mAh/cm^2$.
The current density at the time of actual measurement of the molten salt battery 1 is 0.065 $mA/cm^2$.

(Results)
The actual measured capacity of the molten salt battery 1 was 0.62 $mAh/cm^2$.
The utilization ratio was 97%.

Comparative Example 2

(Structure)
The materials and the method for forming the positive electrode 10 are the same as those as described in Comparative Example 1.

(Conditions)
The filling amount of the active material 12 in the current collector 11 is 0.1 $g/cm^2$.
The amount of the positive electrode active material is 85 $mg/cm^2$.
The thickness of the positive electrode 10 after being applied to the aluminum sheet 60 is 500 μm.
The theoretical capacity of the molten salt battery 1 is 6.37 $mAh/cm^2$.
The current density at the time of actual measurement of the molten salt battery 1 is 0.65 $mA/cm^2$.

(Results)
The actual measured capacity of the molten salt battery 1 was 0.52 $mAh/cm^2$.
The utilization ratio was 8.1%.

Figure 7:
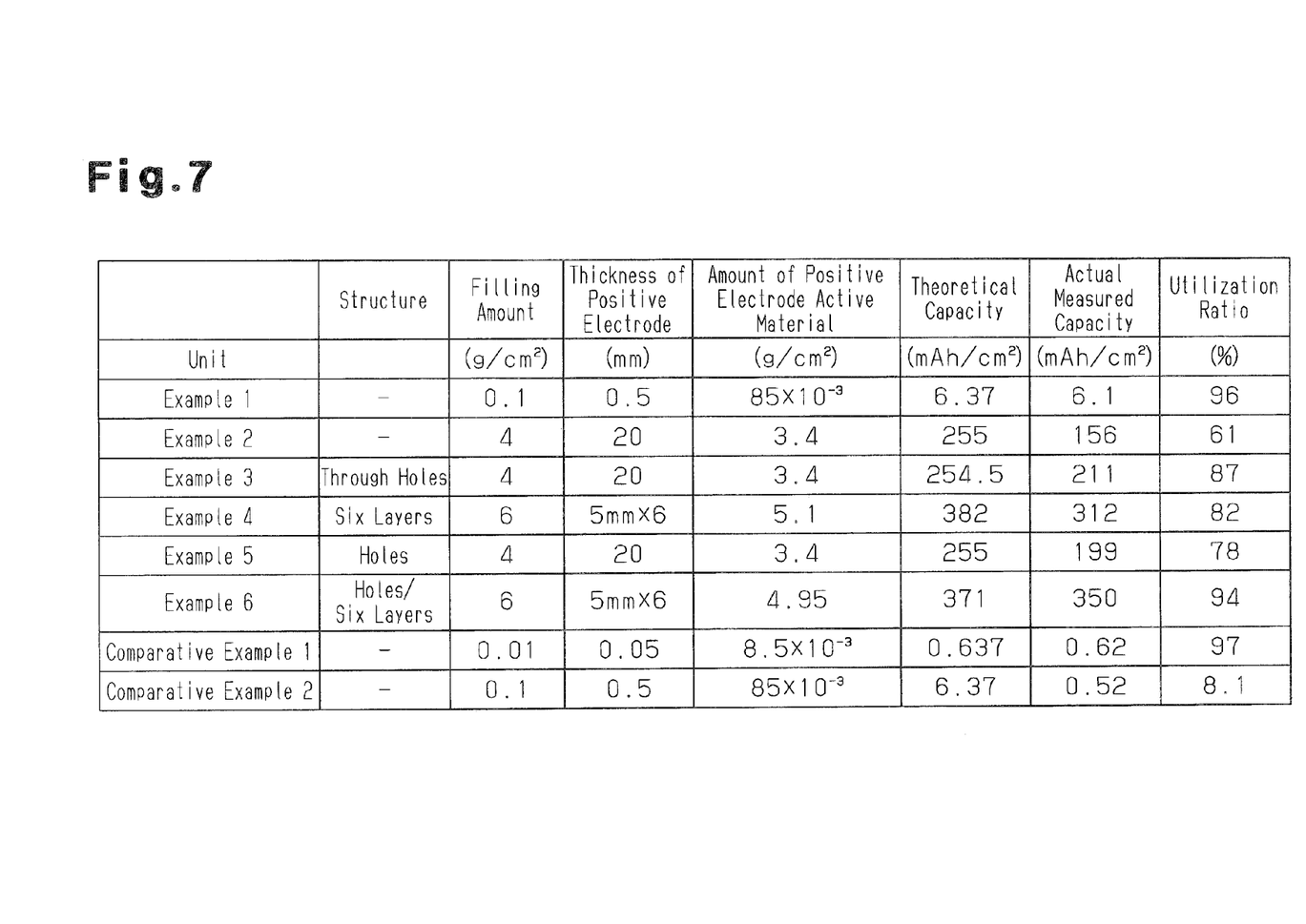
FIG. 7 is a table comparing the molten salt batteries of Examples with the molten salt batteries of Comparative Examples.

Comparison Between Examples and Comparative Examples
Examples and Comparative Examples are compared with reference to FIG. 7.

As shown in Comparative Example 1, when the thickness of the positive electrode 10 is small, the utilization ratio of the positive electrode active material is high, and the actual measured capacity is a value close to the theoretical capacity value. However, as shown in Comparative Example 2, when the thickness of the positive electrode 10 is increased, the utilization ratio of the positive electrode active material is significantly reduced, and the actual measured capacity is considerably smaller than the theoretical capacity. That is, in the structure in which the active material 12 is applied to the aluminum sheet 60, when the thickness of the positive electrode 10 is increased to a specific value or more, the utilization ratio of the positive electrode active material and the actual measured charge capacity are significantly reduced.

(1) Comparative Example 2 is Compared with Example 1
The thickness of the positive electrode 10 and the amount of the positive electrode active material in Comparative Example 2 are equal to those in Example 1. However, the positive electrode 10 of Example 1 has a higher utilization ratio of the positive electrode active material than the positive electrode 10 of Comparative Example 2. Further, the positive electrode 10 of Example 1 has a larger actual measured capacity than the positive electrode 10 of Comparative Example 2.

(2) Example 1 is Compared with Example 2
With respect to other conditions than the thickness of the positive electrode 10, Example 1 has the same positive electrode structure as Example 2. The thickness of the positive electrode 10 of Example 2 is 40 times the thickness of the positive electrode 10 of Example 1. The filling amount of the active material 12 and the amount of the positive electrode active material in the positive electrode 10 of Example 2 are 40 times those in the positive electrode 10 of Example 1. The utilization ratio of the positive electrode active material in the positive electrode 10 of Example 2 is smaller than that in the positive electrode 10 of Example 1. The actual measured capacity of the positive electrode 10 of Example 2 is larger than that of the positive electrode 10 of Example 1. That is, in Examples 1 and 2, when the thickness of the positive electrode 10 and the filling amount of the active material 12 are increased, the utilization ratio of the positive electrode active material is reduced. However, the degree of the reduction in the utilization ratio when the thickness of the positive electrode 10 and the filling amount of the active material 12 are increased is suppressed within a small range. Therefore, the actual measured capacity increases depending on the thickness of the positive electrode 10 and the filling amount of the active material 12.

(3) Example 2 is Compared with Example 3

The positive electrode 10 of Example 3 is obtained by providing the through holes 16 each having a diameter of 0.5 mm at equal intervals in the positive electrode 10 of Example 2. Other than this point, the positive electrode 10 of Example 3 has the same structure as the positive electrode 10 of Example 2. That is, the positive electrode 10 of Example 3 has a structure in which molten salt easily enters the inner part of the positive electrode 10 through the through holes 16. The utilization ratio of the positive electrode active material in the positive electrode 10 of Example 3 is larger than that in the positive electrode 10 of Example 2. The actual measured capacity of the positive electrode 10 of Example 3 is larger than that of the positive electrode 10 of Example 2.

The positive electrode 10 of Example 4 is formed by laminating six partial positive electrodes 10a each having a thickness of 5 mm. The total thickness of the positive electrode 10 of Example 4 corresponds to 1.5 times the thickness of the positive electrode 10 of Example 2. Then, when the actual measured capacity of the positive electrode 10 of Example 4 is compared with a value of 1.5 times the actual measured capacity of the positive electrode 10 of Example 2, the former is larger than the latter. That is, if the total thickness of the positive electrode 10 is the same, the charge capacity of a positive electrode prepared by laminating a plurality of positive electrodes 10 is larger than that prepared by only increasing the thickness of the positive electrode 10.

(4) Example 5 is Compared with Example 2

In the positive electrode 10 of Example 5, voids are formed in the inner part of the electrode by the sublimation of naphthalene. Other than this point, the positive electrode 10 of Example 5 has the same structure as the positive electrode 10 of Example 2. That is, the positive electrode 10 of Example 5 has a structure in which molten salt easily enters the inner part through the voids. The utilization ratio of the positive electrode active material in the positive electrode 10 of Example 5 is larger than that in the positive electrode 10 of Example 2. The actual measured capacity of the positive electrode 10 of Example 5 is also larger than that of the positive electrode 10 of Example 2.

(5) Example 4 is Compared with Example 6

Both the positive electrodes 10 of Examples 4 and 6 are formed by laminating six partial positive electrodes 10a each having a thickness of 5 mm. Voids are not provided in the positive electrode 10 of Example 4. Voids are formed in the inner part of the partial positive electrode 10a of Example 6 by the sublimation of naphthalene. That is, the partial positive electrode 10a of Example 6 has a structure in which molten salt easily enters the inner part of the partial positive electrode 10a through the voids. The utilization ratio of the positive electrode active material in the positive electrode 10 of Example 6 is larger than that in the positive electrode 10 of Example 4. The actual measured capacity of the positive electrode 10 of Example 6 is also larger than that of the positive electrode 10 of Example 4.

According to the present Examples, the following operational advantages can be generated.

(1) In the molten salt battery 1 of Examples 1 to 6, the current collector 11 has the internal space 13 in which the small spaces 14 are coupled. The internal space 13 is filled with the active material 12.

In the case of an electrode in which the active material 12 is applied to the planar current collector 11, if the thickness of the layer of the active material 12 is increased, the distance from the positive electrode active material in the layer of the active material 12 to the current collector 11 will be increased. In this case, there is a correlation between the distance from the positive electrode active material to the current collector 11 and the electrical resistance. Therefore, if the thickness of the layer of the active material 12 is increased, the utilization ratio of the positive electrode active material in the active material 12 will decrease correspondingly. As a result, even if the thickness of the layer of the active material 12 is increased to increase the amount of the positive electrode active material, the charge capacity will not be increased depending on the increase in the amount of the positive electrode active material. On the other hand, according to the present invention, since the internal space 13 of the current collector 11 is filled with the active material 12, the distance between the positive electrode active material and the current collector 11 will not be increased even if the thickness of the layer of the active material 12 is increased. Therefore, reduction in the utilization ratio of the positive electrode active material is suppressed even if the thickness of the positive electrode 10 is increased. Consequently, the charge capacity can be increased depending on the increase in the thickness of the positive electrode 10 without being influenced by the thickness of the positive electrode 10.

(2) In the molten salt batteries 1 of Examples 3 and 5, the positive electrode 10 is provided with the through holes 16 and holes 15, respectively, for pouring molten salt thereinto. According to this structure, ions of the molten salt flow into the through holes 16 or the holes 15 of the positive electrode 10. Further, the ions of the molten salt also permeate the active material 12 from the surface in the through holes 16 or the holes 15. That is, since the surface area of the positive electrode 10 is increased by providing the voids such as the through holes 16 or the holes 15 in the positive electrode 10, the movement of the ions into the active material 12 and the movement of the positive electrode active material into the molten salt are promoted. This improves the utilization ratio of the positive electrode active material.

(3) In the molten salt battery 1 of Example 3, the through holes 16 are provided along the direction from the positive electrode 10 to the negative electrode 20 (electric field direction). Generally, in the molten salt battery 1, the ions of molten salt move from the positive electrode 10 to the negative electrode 20. That is, in Example 3, since the through holes 16 extend along the direction in which ions of the molten salt flow, the molten salt can be smoothly moved.

(4) In the molten salt battery 1 of Example 5, the holes 15 are formed by sublimation of a sublimable substance. According to this structure, mechanical force is not applied to the positive electrode 10 when the holes 15 are formed in the positive electrode 10. Therefore, reduction in the mechanical strength of the positive electrode 10 can be suppressed compared with the case where the holes 15 are mechanically formed in the positive electrode 10.

(5) In the molten salt batteries 1 of Examples 1 to 6, an aggregate of aluminum fibers 11a is used as the current collector 11. According to this structure, the gap between the aluminum fibers 11a is the small space 14 to hold the active material 12, and the small spaces 14 are coupled in the shape of a network to form the internal space 13. Further, since aluminum is lighter than copper and iron, the aluminum fibers can reduce the weight of the current collector 11 as compared with the current collectors 11 made of copper fibers and iron fibers.

(6) In the molten salt batteries 1 of Examples 1 to 6, the thickness of the positive electrode 10 is 0.1 mm or more and 50 mm or less.

In the molten salt battery 1 of Comparative Example 1, the utilization ratio of the positive electrode active material is 97%. That is, when the thickness of the positive electrode 10 is less than 0.1 mm, there is no difference between the charge capacity of the positive electrode 10 formed from the active material 12 of the above components and that of a conventional positive electrode 10 in which the active material 12 is laminated to the aluminum sheet 60. On the other hand, if the thickness of the positive electrode 10 exceeds 50 mm, the electric resistance of the positive electrode 10 will be increased. According to the present invention, when the positive electrode 10 is formed in the thickness as described above, the electrical resistance of the positive electrode 10 can be suppressed from being excessively increased, and the charge of the molten salt battery 1 can be ensured.

(7) In the molten salt battery 1 of Examples 1 to 6, NaFSA-KFSA is used as molten salt. The eutectic point of this type of molten salt is lower than the operating temperature of a NaS battery. Therefore, the operating temperature of the molten salt battery can be made lower than that of the NaS battery.

(8) The method for producing the molten salt battery 1 of Examples 1 to 6 includes a filling step for filling the current collector 11 with the active material 12 containing a positive electrode active material, a compression step for compressing the current collector 11 filled with the active material 12, and a hole-forming step for forming the through hole 16 in the compressed molded product with a drill. According to this structure, the through hole 16 can be formed in a predetermined position since a drill is used.

(9) The method for producing the molten salt battery 1 of Examples 1 to 6 includes a filling step for filling the current collector 11 with the active material 12 containing a positive electrode active material and a sublimate substance, a compression step for compressing the current collector 11 filled with the active material 12, and a heating step for heating a pellet formed in the compression step to sublimate the sublimable substance.

Since the sublimable substance is solid at ordinary temperature, it occupies a region in the active material 12. Further, even if the active material 12 containing the sublimable substance is compressed, the region occupied by the sublimable substance as a solid is compressed only insignificantly. Therefore, voids can be formed in the compressed pellet by heating the pellet to sublimate the sublimable substance.

The embodiment of the present invention may be changed as described below.

Figure 8:
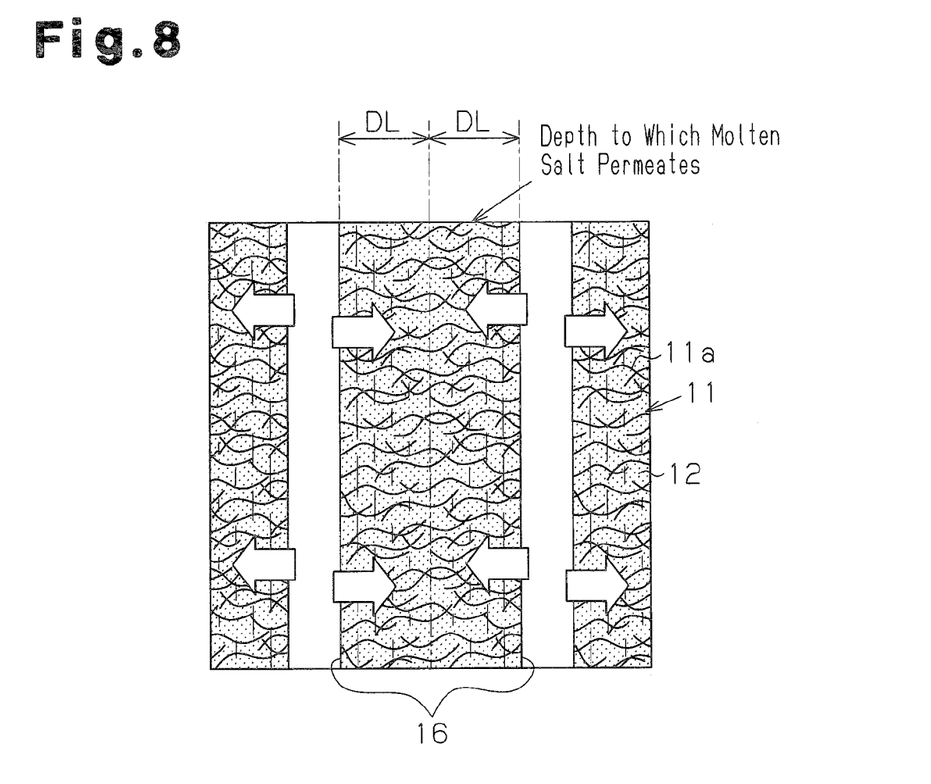
FIG. 8 is a schematic diagram showing the internal structure of an Example.

In each Example, the interval between adjacent through holes 16 may be a predetermined reference distance or less. Specifically, the interval between the through holes 16 is preferably twice or less the critical immersion distance DL to which the ions of molten salt permeate the active material 12. The critical immersion distance DL is defined as the thickness of the active material 12 at the time when the utilization ratio of the positive electrode active material is 95% in the positive electrode 10 in which the active material 12 of Example 1 is applied to the aluminum sheet 60.

As shown in FIG. 8, the critical immersion distance DL represents the depth to which the ions of molten salt permeate the active material 12. In the case of the active material 12 of Example 1, the critical immersion distance DL is 2 mm. Therefore, from the point of view of the utilization ratio of the positive electrode active material, the interval between the through holes 16 is preferably twice the critical immersion distance DL, that is, about 4 mm.

The oxidation-reduction reaction is performed not only on the surface of the active material 12, but also in the inner part of the active material 12. On the other hand, in the part in which the ions of molten salt do not permeate the active material 12, the oxidation-reduction reaction is unlikely to occur. If the limitation of the interval between the through holes 16 is followed, the part in which the oxidation-reduction reaction does not occur can be reduced by specifying the distance between the voids. This improves the utilization ratio of the positive electrode active material.

In the Examples, the thickness of the positive electrode 10 was in the range of from 0.5 mm to 20 mm, but it may be set in the range of from 0.1 mm to 50 mm. When the thickness of positive electrode 10 is less than 0.1 mm, the difference between the utilization ratio of the positive electrode active material in Example and the utilization ratio of the positive electrode active material in Comparative Example 1 is small. Therefore, the advantages of the present invention are small in the case of the positive electrode structure having a thickness of less than 0.1 mm. If the thickness of the positive electrode 10 is larger than 50 mm, the distance between a first surface of the positive electrode 10 which is in contact with the positive electrode case 41 and a second surface located on the opposite side of the first surface will be increased. This increases the electrical resistance of the positive electrode 10, which is not practically preferred. Therefore, the thickness of the positive electrode 10 is preferably 0.1 mm or more and 50 mm or less.

The voids were formed in the positive electrode 10 by forming the through holes 16 with a drill in Example 3 or by mixing naphthalene with the active material 12 followed by sublimating the same. However, the positive electrode 10 may be compressed with a mold having projections to form depressions as the voids in the positive electrode 10.

In Examples 1, 2, 3, and 5, the positive electrode 10 of the present embodiment was used in the molten salt battery 1 in which the positive electrode 10 and the negative electrode 20 were used as a pair. Further, in Examples 4 and 6, the positive electrode 10 of the present embodiment was used in the molten salt battery 1 in which the positive electrodes 10 was connected to the negative electrodes 20 in parallel. In addition to this, the positive electrode 10 of the present embodiment may be used in a series-connected molten salt battery 1.

Figure 9:
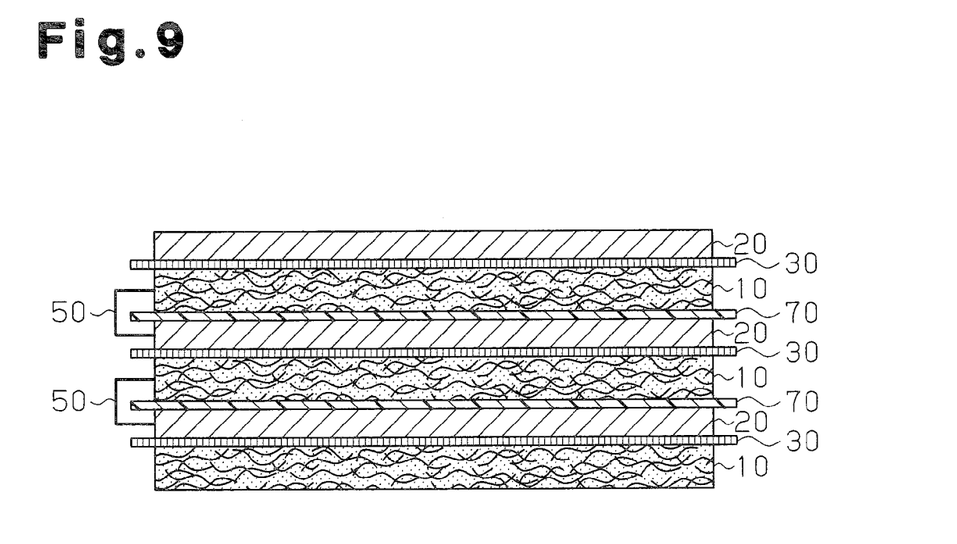
FIG. 9 is a schematic diagram showing a modification of the molten salt battery.

FIG. 9 shows the series-connected molten salt battery 1. Insulation sheets 70 are provided between a plurality of cells each consisting of a positive electrode 10, a separator 30, and a negative electrode 20. The positive electrode 10 and the negative electrode 20 of the cell are connected with a conductive line 50.

In each Example, $NaCrO_2$ was used as a positive electrode active material. However, any positive electrode active material may be used as long as it incorporates the metal of a molten salt into the inner part thereof at the time of discharge and releases the metal of the molten salt at the time of charge. For example, $TiS_2$, $NaMnF_3$, $Na_2FePO_4F$, $NaVPO_4F$, $Na_{0.44}MnO_2$, or $FeF_3$ may be used as a positive electrode active material. It is also possible to use a positive electrode active material obtained by combining a plurality of metallic compounds selected from the group consisting of the above metallic compounds.

In each Example, NaFSA-KFSA was used as a molten salt. However, a molten salt in which R1 and R2 of formula (1) are replaced with CF3 (hereinafter, TFSA) and that in which R1 and R2 are replaced with F and CF3, respectively, may be used instead of FSA. Further, a molten salt may be formed by using, as anions, two or more selected from molten salts in which R1 and R2 of the above formula (1) are independently replaced with F or a fluoroalkyl group.

The molten salt is not limited to a molten salt in which Na or K is used as a cation. The molten salt may be formed by using, as cations, one or two or more selected from the group consisting of alkali metals and alkaline earth metals. Further, the molten salt may also be formed of simple salt.

The alkali metals are selected from Li, Na, K, Rb, and cesium Cs. Further, the alkaline earth metals are selected from Be, Mg, Ca, Sr, and Ba.

The simple salt of the molten salt in which FSA is used as an anion includes LiFSA, NaFSA, KFSA, RbFSA, CsFSA, Be(FSA)$_2$, Mg(FSA)$_2$, Ca(FSA)$_2$, Sr(FSA)$_2$, and Ba(FSA)$_2$. A mixture thereof may also be used as the molten salt of the molten salt battery 1.

The simple salt of the molten salt in which TFSA is used as an anion includes LiTFSA, NaTFSA, KTFSA, RbTFSA, CsTFSA, Be(TFSA)$_2$, Mg(TFSA)$_2$, Ca(TFSA)$_2$, Sr(TFSA)$_2$, and Ba(TFSA)$_2$. A mixture thereof may also be used as the molten salt of the molten salt battery 1.

In each Example, the composition of NaFSA-KFSA was 45 mol % and 55 mol %, respectively. However, the molar ratio of KFSA may be set, for example, in the range of 0.4 or more and 0.7 or less. In this range, the molar ratio of KFSA is more preferably in the range of 0.5 or more and 0.6 or less. The molar ratio of KFSA is represented by the ratio of the number of moles of K-cation to that of the cations in the whole molten salt.

In each Example, any material may be used as the current collector 11 as long as the small spaces 14 are mutually connected to form the internal space 13. For example, a metal porous body may be used as the current collector 11.

In each Example, a structure in which the internal space 13 of the current collector 11 has been filled with the active material 12 was applied to the positive electrode 10, but the structure may also be applied to the negative electrode 20. In this case, the utilization ratio of the negative electrode active material is improved depending on the increase in the thickness of the negative electrode 20. The charge capacity of the molten salt battery 1 is further increased by designing the structure of the positive electrode 10 and the negative electrode 20 as described above.

The invention claimed is:

1. An electrode for a molten salt battery, the electrode comprising:
   a current collector connectable to an electrode terminal of the molten salt battery; and
   an active material, wherein the current collector has an internal space in which small spaces are coupled, the internal space is filled with the active material,
   wherein a void into which molten salt is flowable is provided in the electrode,
   wherein a direction from a positive electrode to a negative electrode in a state where the electrode is attached to the molten salt battery is defined as an electric field direction, and the void is a through hole extending along the electric field direction,
   wherein an interval between adjacent voids is set to a reference distance or less, the reference distance being determined based on a critical immersion distance,
   wherein the reference distance is set to twice the critical immersion distance to which an ion of a molten salt permeates the electrode,
   wherein the molten salt is electrolyte, the electrolyte is NaFSA-KFSA containing an anion represented by the following formula (1), a sodium cation, and potassium cation:

[Formula 1]

(1)

where $R^1$ and $R^2$ each denote fluorine, and
   wherein the molar ratio of KFSA is set in the range of 0.4 or more and 0.7 or less.

2. The electrode for a molten salt battery according to claim 1,
   wherein the void is a space formed by sublimation of a sublimable substance.

3. The electrode for a molten salt battery according to claim 1,
   wherein the current collector comprises an aggregate of metal pieces.

4. The electrode for a molten salt battery according to claim 3,
   wherein the metal pieces comprise aluminum fiber.

5. The electrode for a molten salt battery according to claim 1,
   wherein the current collector comprises a metal porous body.

6. The electrode for a molten salt battery according to claim 1,
   wherein the active material is at least one selected from the group consisting of NaCrO$_2$, TiS$_2$, NaMnF$_3$, Na$_2$FePO$_4$F, NaVPO$_4$F, Na$_{0.044}$MnO$_2$, and FeF$_3$.

7. The electrode for a molten salt battery according to claim 1,
   wherein the thickness of the electrode is set to 0.1 mm or more and 50 mm or less.

8. A molten salt battery, comprising:
   a negative electrode;
   a molten salt;
   a positive electrode composed of an electrode according to claim 1; and
   a separator to isolate the negative electrode from the positive electrode.

9. The molten salt battery according to claim 8,
   wherein the molten salt battery comprises a plurality of sets of negative electrodes and positive electrodes which are formed by alternately laminating the negative electrode and the positive electrode, and wherein the separator is provided between the negative electrode and the positive electrode in each set of the negative electrode and the positive electrode.

* * * * *